(12) United States Patent
El-Ghazal et al.

(10) Patent No.: US 10,876,859 B2
(45) Date of Patent: Dec. 29, 2020

(54) OPPORTUNISTIC CALIBRATION OF A SMARTPHONE ORIENTATION IN A VEHICLE

(71) Applicant: Appy Risk Technologies Limited, Waterloo (CA)

(72) Inventors: Akrem El-Ghazal, Waterloo (CA); Jason Toonstra, Elmira (CA); William Ben Miners, Guelph (CA); Otman A. Basir, Waterloo (CA)

(73) Assignee: Appy Risk Technologies Limited

( * ) Notice: Subject to any disclaimer, the term of this patent is extended or adjusted under 35 U.S.C. 154(b) by 698 days.

(21) Appl. No.: 15/095,870

(22) Filed: Apr. 11, 2016

(65) Prior Publication Data

US 2017/0023379 A1  Jan. 26, 2017

Related U.S. Application Data

(60) Provisional application No. 62/145,144, filed on Apr. 9, 2015.

(51) Int. Cl.
| | |
|---|---|
| *G01C 21/16* | (2006.01) |
| *G01P 21/00* | (2006.01) |
| *G01C 25/00* | (2006.01) |
| *G01C 21/00* | (2006.01) |

(Continued)

(52) U.S. Cl.
CPC ......... *G01C 25/005* (2013.01); *G01C 21/005* (2013.01); *G01C 21/165* (2013.01); *G01D 18/00* (2013.01); *G01P 21/00* (2013.01); *H04W 4/026* (2013.01); *H04W 4/027* (2013.01)

(58) Field of Classification Search
CPC .................................................. G01C 21/165
See application file for complete search history.

(56) References Cited

U.S. PATENT DOCUMENTS

| | | | |
|---|---|---|---|
| 5,787,384 A | * | 7/1998 | Johnson ............... G01C 21/165 |
| | | | 701/472 |
| 9,070,168 B2 | | 6/2015 | Amigo et al. |
| 9,142,142 B2 | | 9/2015 | Nath et al. |

(Continued)

FOREIGN PATENT DOCUMENTS

| | | |
|---|---|---|
| WO | 2012080741 | 6/2012 |
| WO | 20150134339 | 9/2015 |

OTHER PUBLICATIONS

International Search Report for International Application No. PCT/US2016/026957, dated Jul. 13, 2016.

(Continued)

*Primary Examiner* — Herbert K Roberts

(74) *Attorney, Agent, or Firm* — Carlson, Gaskey & Olds, P.C.

(57) ABSTRACT

An opportunistic calibration method continuously monitors a smartphone orientation and compensates for its variation, as necessary. The method relies on the probabilistic fusion of built-in sensors; in particular, the GPS, accelerometer, gyroscope, and magnetometer. The calibration method may utilize a state-machine approach along with an orientation stability detection algorithm to keep track of the smartphone orientation over time and to coordinate the calibration process in an opportunistic manner. An orientation calibration method may rely mainly on the probabilistic fusion of GPS and magnetometer sensory data.

15 Claims, 6 Drawing Sheets

(51) Int. Cl.
*G01D 18/00* (2006.01)
*H04W 4/02* (2018.01)

(56) References Cited

U.S. PATENT DOCUMENTS

| | | |
|---|---|---|
| 9,200,906 B1 | 12/2015 | Katsman |
| 2008/0234302 A1 | 11/2008 | Basir |
| 2010/0131304 A1 | 5/2010 | Collopy |
| 2012/0022780 A1 | 1/2012 | Kulik et al. |
| 2012/0221244 A1* | 8/2012 | Georgy ............... G01C 21/165 701/472 |
| 2012/0293325 A1 | 11/2012 | Lahcanski et al. |
| 2013/0006674 A1 | 1/2013 | Bowne et al. |
| 2014/0067305 A1* | 3/2014 | Oliver ................. G01B 21/16 702/92 |
| 2014/0113619 A1 | 4/2014 | Tibbitts et al. |
| 2014/0149145 A1* | 5/2014 | Peng ................... G06F 3/0346 705/4 |
| 2014/0320674 A1 | 10/2014 | Kuang |
| 2014/0330596 A1 | 11/2014 | Depura et al. |
| 2014/0357305 A1* | 12/2014 | Haverinen ........... H04W 4/026 455/456.6 |
| 2014/0365030 A1 | 12/2014 | Stacy |
| 2015/0120336 A1 | 4/2015 | Grokop et al. |
| 2015/0141043 A1* | 5/2015 | Abramson ............ G01C 21/34 455/456.1 |
| 2015/0170436 A1 | 6/2015 | Stacy |
| 2015/0213656 A1 | 7/2015 | Stacy |
| 2016/0016590 A1 | 1/2016 | Fernandez Pozo et al. |

OTHER PUBLICATIONS

UDirect, A Novel Approach for Pervasive Observation of User Direction with Mobile Phones. Seyed Amir Hoseinitabatabaei et al, Mar. 21, 2011.

* cited by examiner

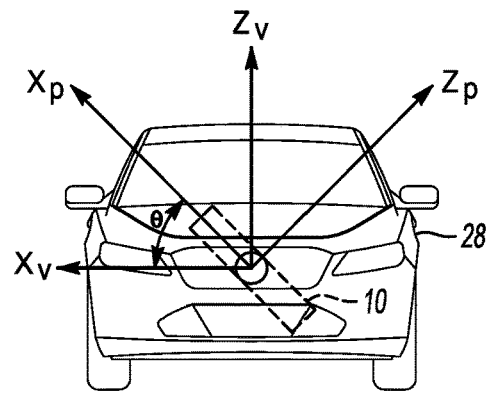
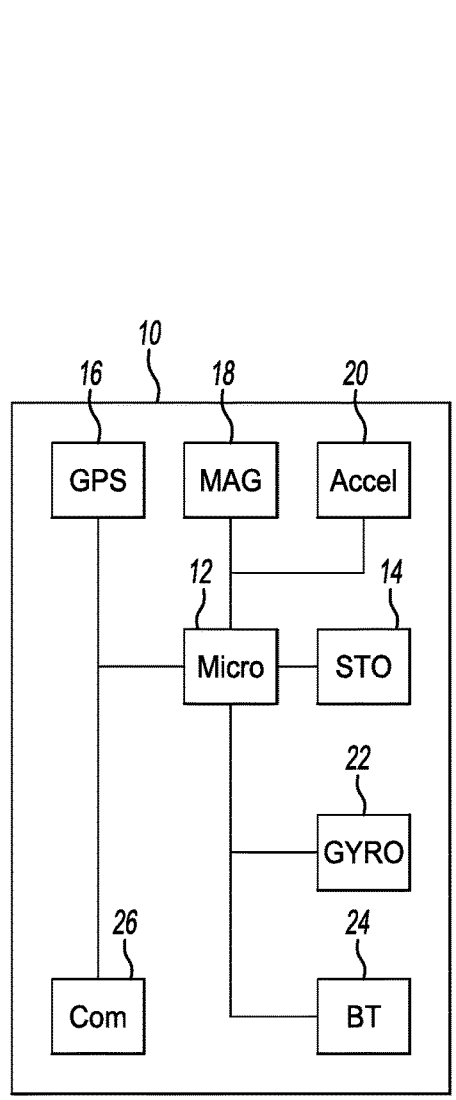
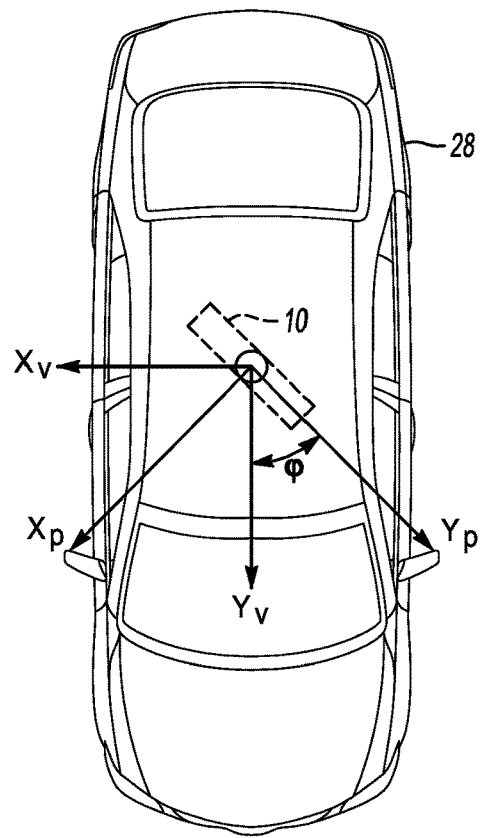
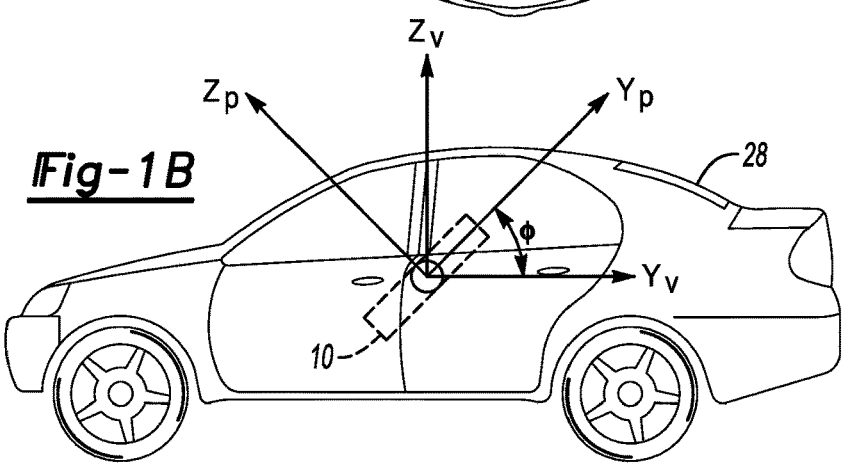
Fig-1A
Fig-1B

I: Instable Orientation
S: Instable Orientation

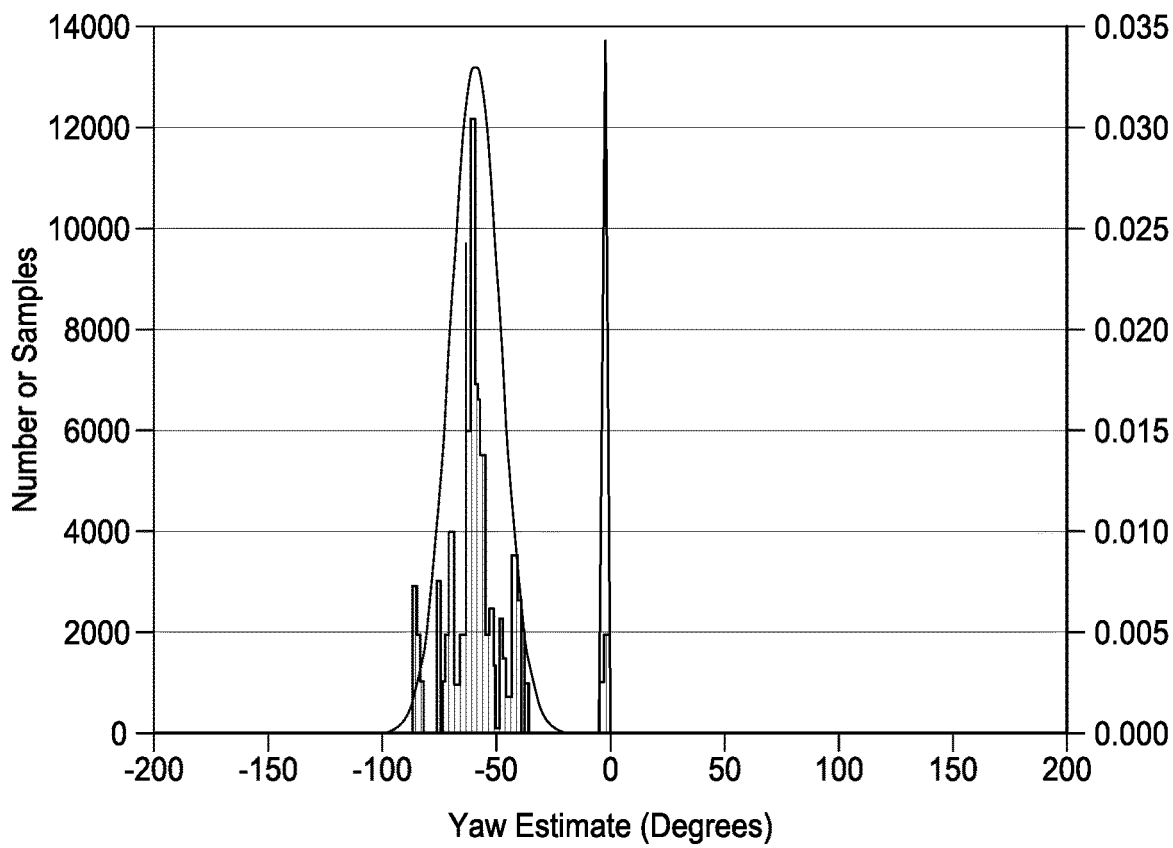

Fig-10

Step 1: Remove the No-fix GPS Samples and Non-calibrated MAG Samples

Step 2: Compute the Candidate Yaw Particles $\{(\hat{yaw}_t, w_{\hat{yaw}_t})\}$
 Step 2.1: $\hat{\psi}_t = (GPS\ CSE)_t - (MAG\ HEAD)_t$
 Step 2.2: $w_{\hat{\psi}_t} = PCC_{W_{PCC}}((GPS\ CSE)_t, (MAG\ HEAD)_t)$ Step 3: Stochastic Re-sampling of the Candidate Yaw Particles Step 4: Compute the Histogram of the Re-sampled Candidate Yaw Particles Step 5: Fit a GMM with Two Components to the Resampled Candidate Yaw's Histogram Step 6: Obtain the Final Yaw Estimate $\hat{\psi}$ Using Heuristic Rules

Fig-11

OPPORTUNISTIC CALIBRATION OF A SMARTPHONE ORIENTATION IN A VEHICLE

BACKGROUND

The ubiquity of modern smartphones, along with their powerful sensing, processing, and communication capabilities, has made them an attractive platform to realize the next generation of the telematics solutions. The sensory data provided by a smartphone are typically measured with respect to the smartphone's frame of reference. Thus, for the smartphone sensory data to be useful in telematics applications, they must be re-oriented to align with the vehicle's frame of reference, a process known as smartphone calibration. Most importantly, this enables a proper association of the 3D accelerometer data of the smartphone to the lateral and longitudinal acceleration of the vehicle without any user intervention. In contrast to the telematics dongle devices commonly deployed today, which are permanently affixed to the body of the vehicle, the smartphone orientation might easily vary while the vehicle is being driven. Accordingly, the calibration process must be estimating the smartphone orientation opportunistically. In fact, a recent study argues that partial information availability is the main difference between the new smartphone-based and the conventional dongle-based telematics solutions. This signifies the requirement for the development of novel telematics solutions capable of exploiting smartphone data in an opportunistic manner.

Nonetheless, much of the related work is based on the assumption that the smartphone orientation is held constant while driving using a mount. This has the drawbacks of requirement for a mount accessory and also the user inconvenience of placing and removing the smartphone in and out of the vehicle mount, hence restricting the applicability significantly.

In the last decade, the concept of Usage-Based Insurance (UBI) has emerged as a type of automobile insurance whereby the costs of automotive insurance are dependent upon the type of vehicle used and its usage characteristics including duration of driving, distance, and behavior. Some automotive insurance carriers currently provide options to determine premiums based upon information gathered by in-vehicle sensors. These sensors are packaged inside a black box dongle device attached to the diagnostics port of the vehicle. A recent trend in UBI market aim at replacing the dongle devices with a mobile application running on a smartphone. The key advantage of using smartphones for the UBI application is elimination of the initial cost associated with the device hardware. However, deploying smartphones for UBI involves several challenging problems. In particular, the smartphones are not attached to the vehicle body and thus their relative orientation to the vehicle frame of reference is not known and varying at all time. This makes calibration of smartphone orientation an essential enabler of the smartphone-based UBI technology.

SUMMARY

The proposed opportunistic calibration method avoids making the above-mentioned unrealistic assumptions. Moreover, some of the most well-known calibration methods in the literature advocate deployment of harsh acceleration/braking events to achieve orientation calibration and avoid magnetometers due to their susceptibility to electromagnetic interference. In contrast, the proposed calibration method proposes a solution to tackle the electromagnetic interference issue of the magnetometer.

Optionally, the calibration method provides a state-machine approach along with an orientation stability detection algorithm to keep track of the smartphone orientation over time and to coordinate the calibration process in an opportunistic manner.

As another option, an orientation calibration method relies mainly on the probabilistic fusion of GPS and magnetometer sensory data.

BRIEF DESCRIPTION OF THE DRAWINGS

The drawings can be briefly described as follows:

FIG. 1A is a schematic of a smartphone that can be used to implement the present invention.

FIG. 1B illustrates the relationship of the smartphone reference system and the vehicle's reference system.

FIGS. 9 and 10 illustrate the corresponding yaw estimate weights over time and the resultant weighted histogram of the yaw candidates fitted with two Gaussian components, respectively.

FIG. 11 provides a pseudocode representation of the proposed yaw estimation algorithm.

DETAILED DESCRIPTION

Figure 2:
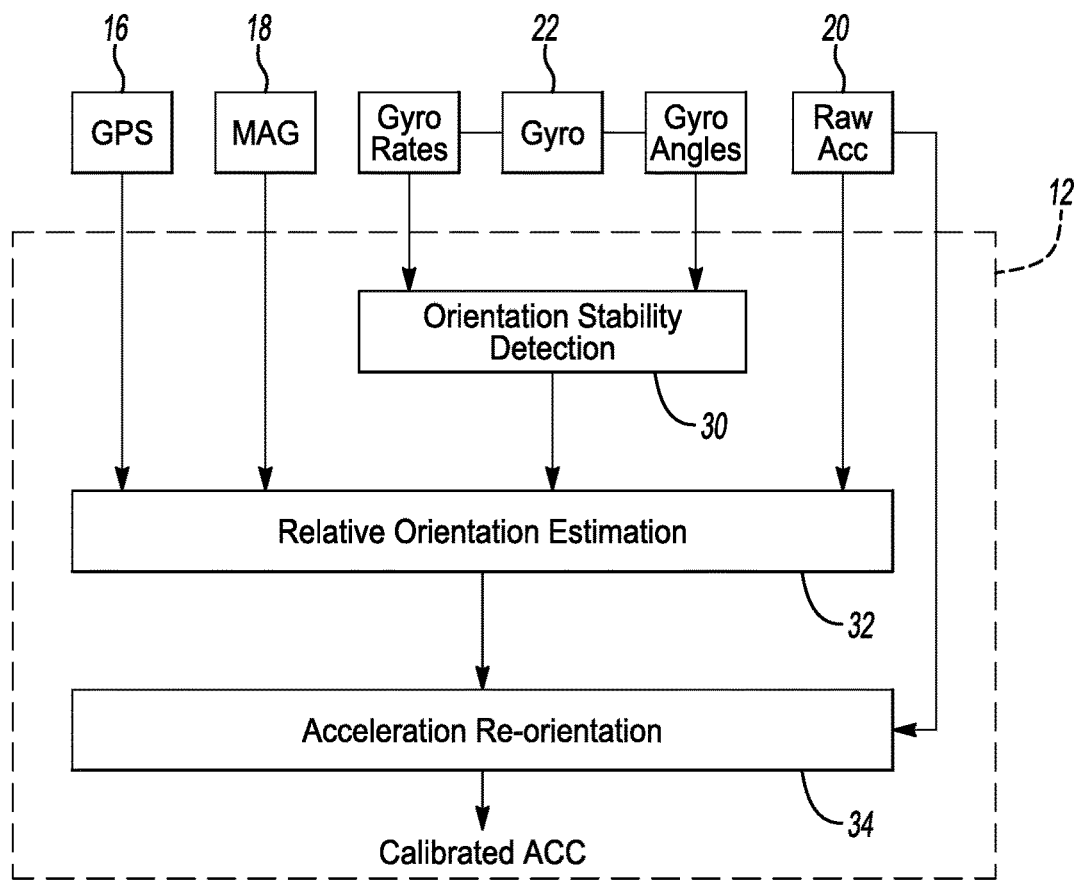
FIG. 2 illustrates an architectural overview of the proposed method.

FIG. 1A is basic schematic of a smartphone 10. The smartphone 10 includes a processor 12 and electronic storage 14. The smartphone 10 includes one or more of a plurality of sensors, such as GPS 16 (meaning more generally any type of GNSS), magnetometer 18, three-axis accelerometer 20 and gyros 22. Other sensors could be used instead of or in addition to these sensors. As is well-known, the smartphone 10 includes many other elements, such as communication circuits, including a cell communication circuit 26, Bluetooth 24, Wifi, NFC, and other user interface elements, such as a touchscreen, various buttons, microphone, speakers, etc. A suitable example of a commercially available smartphone 10 is the iPhone 5s, iPhone 6 and iPhone 6s.

The proposed calibration algorithm relies on the Euler angle representation of smartphone orientation. Accordingly, it objective is to estimate the relative pitch $\varphi$, roll $\theta$, and yaw $\psi$ rotation angles that are required to re-orient the smartphone's 10 reference system [Xp Yp Zp] to the vehicle's 28 frame of reference [Xv Yv Zv]. A pictorial representation of these three angles is provided in FIG. 1B.

FIG. 2 illustrates an architectural overview of the proposed method. The proposed method includes three main components, namely, the orientation stability detection 30, the relative orientation estimation 32, and the accelerometer re-orientation 34 modules. The operation of the calibration method is controlled by the status of an external trip start/end detection module, i.e., the calibration method runs only during a trip. Each of the three main components require a subset of the available sensory data of the smartphone's embedded sensors. In particular, the orientation stability detection 30 method requires the angular rates of rotation and Euler angles of the gyroscope 22. The GPS 16, magnetometer 18, and accelerometer 20 sensory data are deployed by the relative orientation estimation module 32. Lastly, the re-orientation module 34 operates on the raw accelerometer data 20 and maps from the smartphone 10 to the vehicle's 28 frame of reference.

Figure 3:
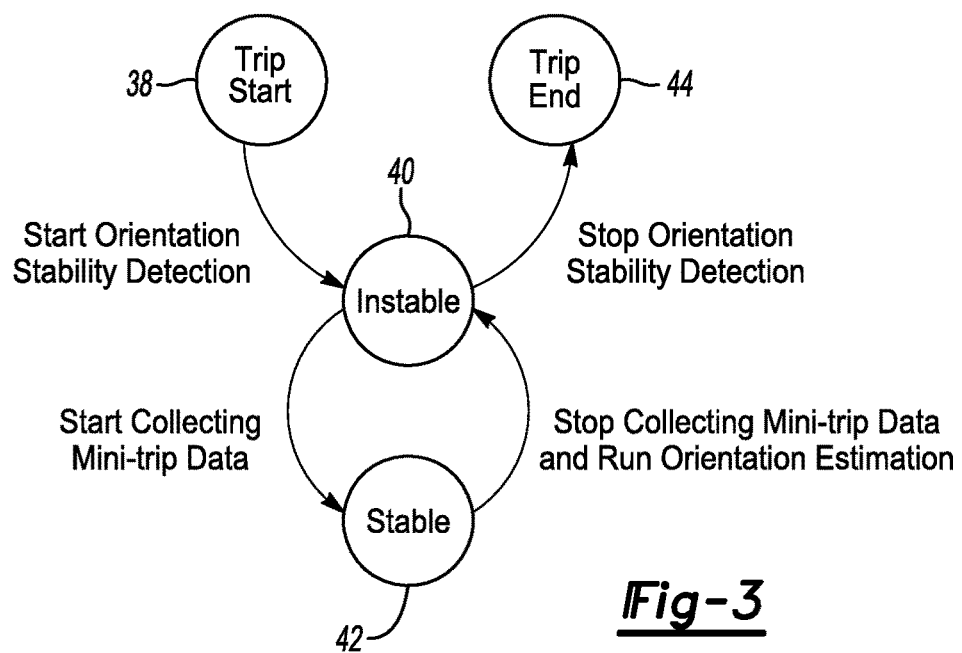
FIG. 3 illustrates an example state machine for governing the coordination of the modules of FIG. 2.
Figure 4:
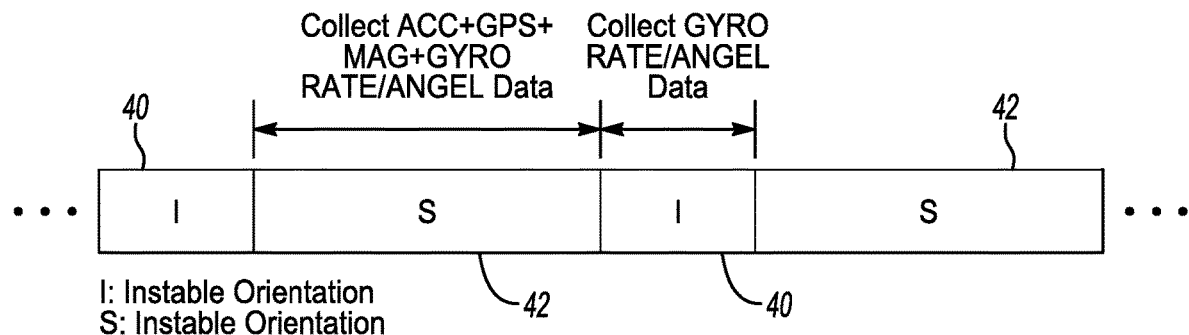
FIG. 4 illustrates the set of sensory data collected during the stable and instable states.

The coordination of the aforementioned modules is governed by a state-machine involving four states as shown in FIG. 3. Upon being started at the trip start mode 38 the orientation stability detection module 30 is launched and the mode defaults to the instable orientation 40. Once the orientation is detected to be stable, the mode transitions into stable 42 and the sensory data required by the relative orientation estimation 32 module are collected. The set of sensory data collected during the stable and instable states are illustrated in FIG. 4. As soon as the smartphone 10 orientation is detected to be instable 40, the relative orientation estimation module 32 is launched using the sensory data collected during the stable mode 42. This process is repeated until the end of trip is detected wherein the mode is transitioned into trip end 44 and the stability detection module 30 is stopped.

A two-stage algorithm detects the instability of smartphone 10 orientation. The algorithm relies on both the rates of rotation and the roll and pitch Euler angles provided by gyroscope 22. Let the normalized recent power of the rates of rotation sensory data ω at time t, $P_{rotation}$, to be defined within a predefined window of time $W_{rotation}$ as $$P_{rotation}^t = \frac{\sum_{t=t-W_{rotation}}^{t} \omega_{x,t}^2 + \omega_{y,t}^2 + \omega_{z,t}^2}{f_{rotation}, W_{rotation}}, \quad (1)$$

where $f_{rotation}$ denotes the sampling rate of gyroscopic data. Then the initial smartphone's orientation detection can be obtained as $$\begin{cases} \text{potentially instable} & \text{if } P_{rotation} \geq Thr_{SAM} \\ \text{stable} & \text{otherwise} \end{cases} \quad (2)$$

where $Thr_{SAM}$ denotes the preset significant angular motion (SAM) threshold value.

The main challenge however is setting the appropriate $Thr_{SAM}$ as a very high value could lead to inability to detect instablility, whereas a very low value could result in a large number of false positives. To deal with this issue, the proposed stability detection algorithm 30 operates in two steps. First, a low threshold value, empirically set to 4, is used to detect all potential instabilities. Next, a validation step is performed to eliminate false positives. The validation process relies on the observation that if the smartphone's orientation has indeed varied due to instability, there has to be a noticeable variation in the recent average roll $\bar{\varphi}^t$ and pitch $\bar{\theta}^t$ Euler angles computed within a predefined window of time $W_{Euler\ angles}$. In other words, a potentially instable orientation is considered valid, if the difference between the last and the new $\bar{\varphi}^t$ or $\bar{\theta}^t$ is more than a preset significant angular variation (SAV) threshold $Thr_{SAV}$.

Figure 5:
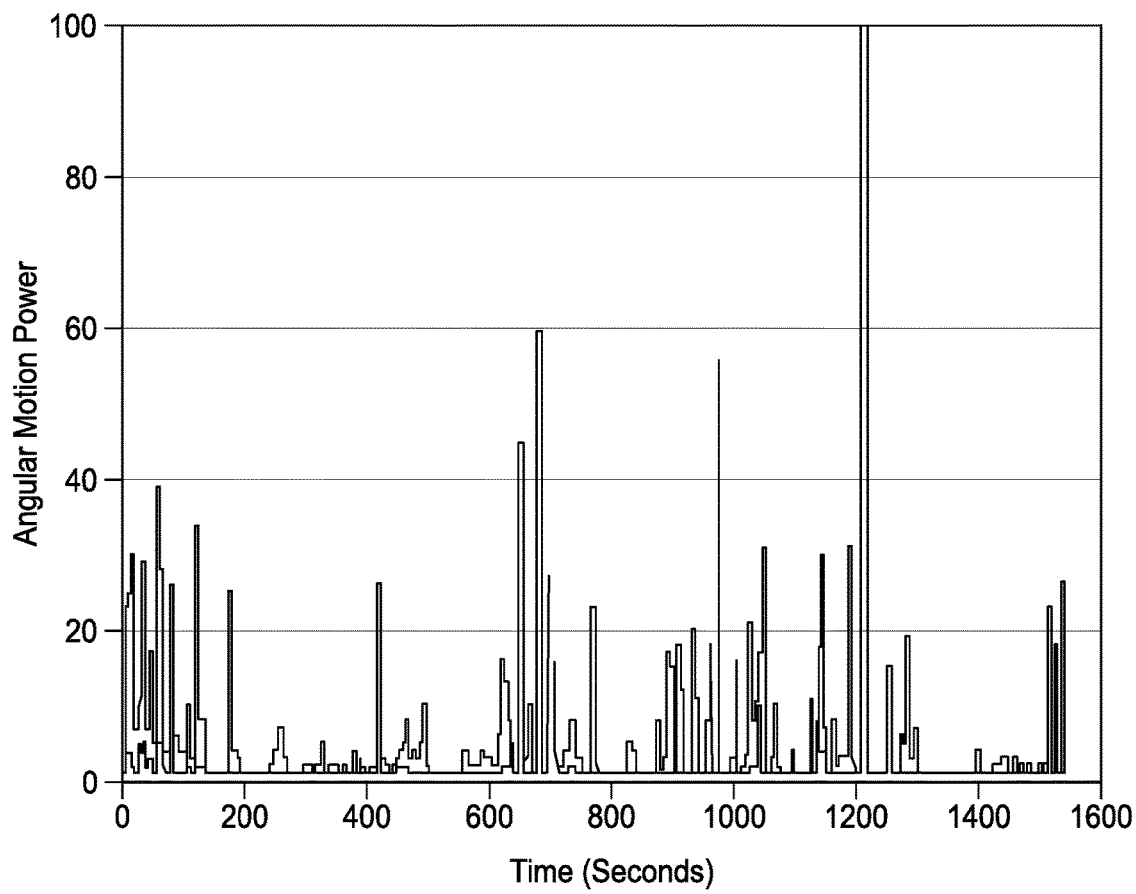
FIGS. 5 to 7 illustrate the rates of rotation, the normalized angular motion power, the roll and pitch Euler angles, and the corresponding orientation stability status for an exemplary test scenario, respectively.
Figure 6:
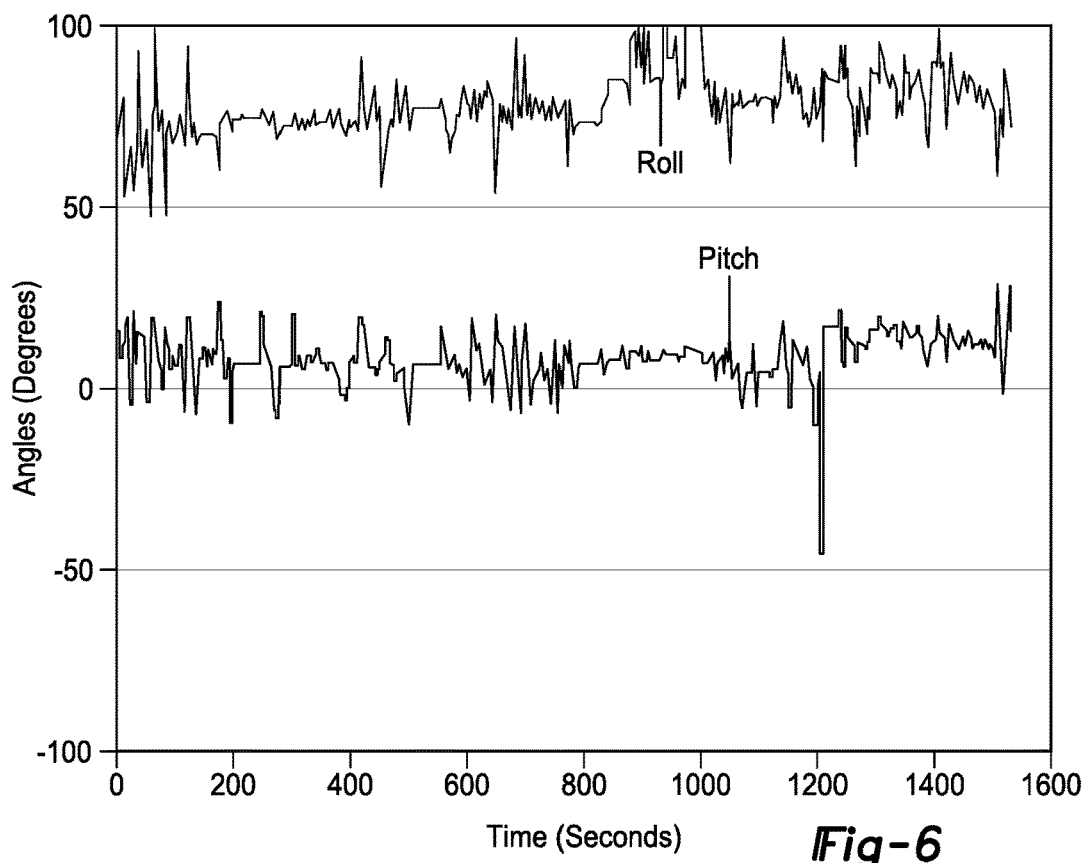
Figure 7:
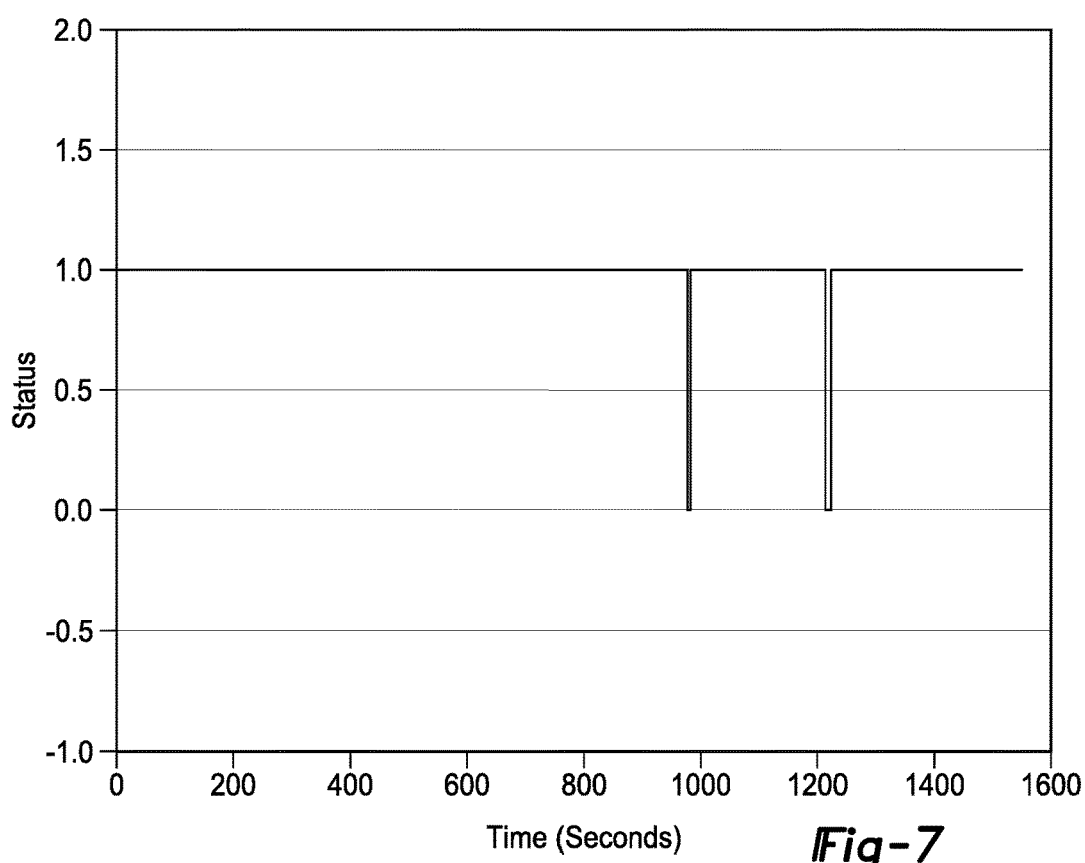

FIGS. 5 to 7 illustrate the rates of rotation, the normalized angular motion power, the roll and pitch Euler angles, and the corresponding orientation stability status for an exemplary test scenario, respectively. The smartphone 10 is placed in a cup holder and changes its orientation twice during the trip. The first variation occurs when the smartphone 10 moves slightly within the cupholder during a sharp turn. The second variation occurs when the user picks up the smartphone to turn off its screen. As shown in FIG. 5, there are a large number of potential instability periods during the trip, according to the normalized angular motion power data. Nonetheless, the validation step of the proposed algorithm is able to successfully filter out the false alarm detections. As shown, only two instability periods, which correspond to significant variation to the roll or pitch Euler angles and occur at about 950 and 1250 seconds into the trip, are detected. The stable orientation time periods beyond two minutes constitute a mini-trip. Accordingly, there are three detected mini-trips for the exemplary test scenario results shown in FIG. 7.

The roll and pitch Euler angles directly affect the reading of the gravity vector on the smartphone 10. This means estimating these two angles require a reliable estimate of the gravity vector, which can be obtained using the median of the raw accelerometer data collected during a mini-trip. Mathematically speaking, given the estimated gravity vector during a mini-trip as $[g_x\ g_y\ g_z]^T$, the roll φ and pitch θ angles can then be estimated as below $$\phi = \arctan\left(\frac{g_y}{g_z}\right) \quad (3)$$

$$\theta = \arctan\left(\frac{g_x}{\sqrt{g_y^2 + g_z^2}}\right) \quad (4)$$

Estimating the yaw angle of the smartphone 10 w.r.t. the vehicle 28 is a challenging problem. Unlike the roll and pitch angles, the yaw angle variations do not affect the gravity vector measured by the smartphone 10. Moreover, estimating the yaw angle requires knowledge of the vehicle's motion direction.

Estimating the yaw angle of the smartphone 10 w.r.t. the vehicle 28 is a challenging problem. Unlike the roll and pitch angles, the yaw angle variations do not affect the gravity vector measured by the smartphone 10. Moreover, estimating the yaw angle requires knowledge of the vehicle's motion direction. The proposed yaw estimation algorithm relies on the GPS 16 course and magnetometer 18 heading data. The vehicle's motion direction relative to the Earth's magnetic north is provided by the GPS 16 course. The magnetometer 18 data represents the heading of the smartphone 10 relative to the Earth's magnetic north. So, theoretically the yaw angle ψ is just the difference between the heading and course data, i.e., $\psi_t = heading_t - course_t$. However, the GPS 16 course and magnetometer 18 heading are typically unreliable due to sensor noise. In particular, the magnetometer 18 heading is notoriously noisy and susceptible to local interference.

To overcome these challenges, a Gaussian mixture model (GMM) based probabilistic inference algorithm is proposed to estimate the yaw angle. The GPS 16 and magnetometer 18 data are typically provided at 1 Hz rate. This means a large number of candidate yaw estimates can be collected during a minitrip. The set of yaw angle estimates obtained during a minitrip can be considered as a particle cloud representation of a probabilistic distribution. Accordingly, to infer the yaw angle a Gaussian mixture model (GMM) involving two components can be fitted to the histogram of the yaw angle estimates. The rationale behind choosing two Gaussians for the GMM fitting procedure is to allow for one Gaussian to be positioned around the true estimates of the yaw angle while the other Gaussian is intended to be positioned around the invalid yaw estimates, obtained due to noise. On the other hand, the yaw estimates obtained using GPS 16 and magnetometer 18 data are reliable only when the cross-correlation between these two signals is high. This observation can be leveraged to further enhance the robustness of the proposed GMM-based inference algorithm. The enhancement is achieved by assigning a weight to each of the yaw angle estimates. The weights are computed using the cross-correlation of the GPS 16 course and magnetometer 18 heading within the temporal vicinity of each estimate.

The algorithm 1 presented in FIG. 11 provides a pseudocode representation of the proposed yaw estimation algorithm. As shown, the first step is to filter out the invalid GPS and magnetometer data. Next, the candidate yaw estimate particles are computed. The weight assigned to each particle is obtained using the Pearson correlation coefficient (PCC) of the GPS course of magnetometer heading data within a predefined window of time $W_{PCC}$. The candidate yaw particles are then resampled according to their weight using a stochastic resampling procedure. The particles with negative weight are simply discarded. The histogram of the resampled yaw estimate particles is then computed and fitted with a Gaussian mixture model (GMM) involving two components. Let GC* to denote the Gaussian component (GC) with the larger weight, and w(GC), μ(GC), and σ(GC) to represent the weight, mean, and covariance of a Gaussian component. In addition, the mode of the histogram H is denoted by mode(H). The last step involves applying a set of heuristic rules to obtain the final estimate of the yaw angle ψ as $$\hat{\psi} = \begin{cases} \text{if } w(GC^*) \geq Thr_{MNW} \\ \quad \text{if } \sigma(GC^*) \leq Thr_{MNC} \\ \quad\quad \text{return } \mu(GC^*) \\ \quad \text{else} \\ \quad\quad \text{return mode}(H) \\ \text{else} \\ \quad \text{if } \frac{w(GC_1)}{\sigma(GC_1)} > \frac{w(GC_2)}{\sigma(GC_2)} \\ \quad\quad \text{return } \mu(GC_1) \\ \quad \text{else} \\ \quad\quad \text{return } \mu(GC_2) \end{cases} \quad (5)$$

where the $Thr_{MNW}$ and $Thr_{MNC}$ denote the minimum non-ambiguous weight (MNW) and maximum non-ambiguous covariance (MNC) thresholds for the GC* to be considered as the representation of the valid yaw estimate distribution, respectively. These thresholds are determined empirically.

Figure 8:
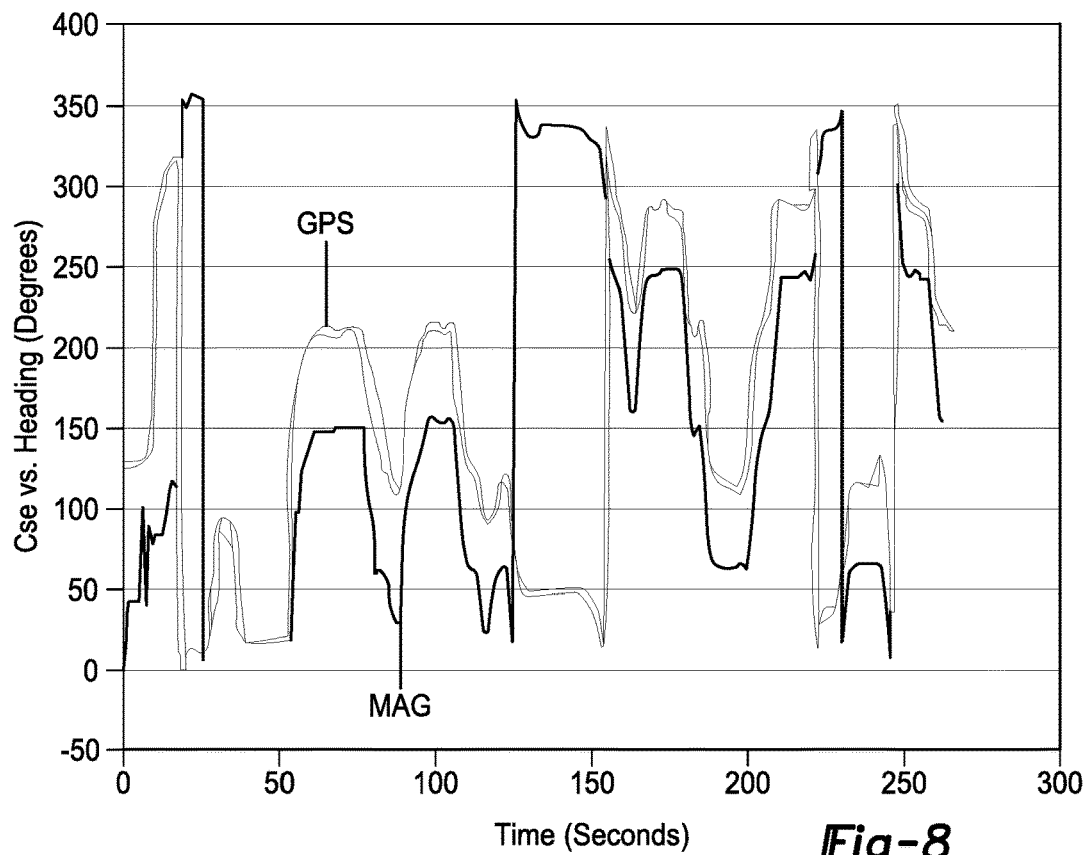
FIG. 8 illustrates the collected GPS course vs. magnetometer heading sensory data for an exemplary test scenario.
Figure 9:
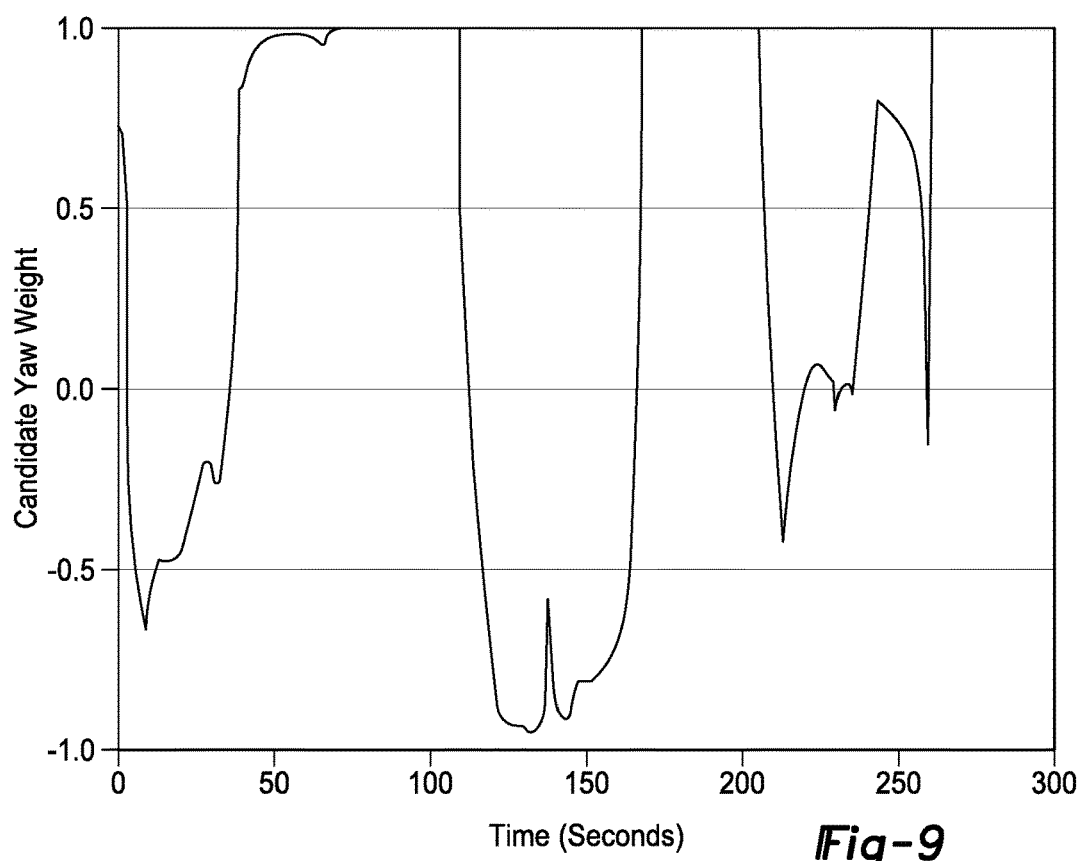

FIG. 8 illustrates the collected GPS course vs. magnetometer heading sensory data for an exemplary test scenario. The corresponding yaw estimate weights over time and the resultant weighted histogram of the yaw candidates fitted with two Gaussian components are shown in FIGS. 9 and 10, respectively. As shown in FIG. 9, the proposed weighting approach is able to successfully discern the time periods where the GPS course and magnetometer heading are both reliable form those whereby they become noisy. For instance, the estimated weights become very small and even negative for the time periods about 25, 150, and 225 seconds into the trip. The GM fitting mechanism yields two Gaussian components positioned around −60° and 0°. As expected, the former GC representing the true yaw estimate contains a much larger mass of particles, and hence a larger weight.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A method for calibrating a relative orientation of a smartphone in a vehicle including the steps of:
    a) determining a stability of the orientation of the smartphone based upon first sensory data, wherein the first sensory data in said step a) includes rates of rotation from a gyroscope in the smartphone;
    b) collecting second sensory data wherein the second sensory data includes GPS data from a GPS receiver on the smartphone and magnetometer data from a magnetometer on the smartphone;
    c) estimating the relative orientation of the smartphone relative to the vehicle based upon the second sensory data collected in said step b) while the orientation of the smartphone was determined to be stable in said step a).

2. The method of claim 1 further including the step of receiving accelerometer data from an accelerometer in the smartphone and re-orienting the accelerometer data based upon said step c).

3. The method of claim 1 wherein said step a) further includes the steps of comparing the first sensory data to a low threshold value to detect potential instability, and validating the instability to determine whether the orientation is stable.

4. The method of claim 3 wherein the step of validating includes the step of comparing a recent sample of the first sensory data to an average of the first sensory data.

5. The method of claim 4 wherein the step of validating includes the step of determining instability based upon the recent sample exceeding the average by more than a threshold.

6. The method of claim 1 wherein said step c) further includes the step of comparing the GPS data to the magnetometer data.

7. The method of claim 6 wherein said step c) further includes the step of filtering out invalid GPS data and invalid magnetometer data.

8. The method of claim 7 wherein said step c) further includes the steps of:
    estimating a yaw angle of the smartphone relative to the vehicle a plurality of times during a minitrip to generate a plurality of yaw angle estimates;
    treating each of the plurality of yaw angle estimates as a particle in a particle cloud representation of a probabilistic determination;
    obtaining a final estimate of the yaw angled based upon the particle cloud representation.

9. The method of claim 8 wherein said step c) further includes the step of assigning a weight to each particle based upon correlation of GPS data and magnetometer data within a window of time.

10. A smartphone comprising:
    a GPS receiver;

a magnetometer;

a gyroscope;

a processor receiving GPS data from the GPS receiver, magnetometer data from the magnetometer and gyro data from the gyroscope, the processor programmed to determine a stability of the orientation of the smartphone based upon gyro data, the processor programmed to collect GPS data and magnetometer data and to estimate the orientation of the smartphone relative to a vehicle based upon the GPS data and magnetometer data collected while the orientation of the smartphone was determined to be stable.

11. The smartphone of claim 10 wherein the processor is further programmed to receive accelerometer data from an accelerometer in the smartphone and re-orient the accelerometer data based upon the estimated relative orientation.

12. The smartphone of claim 10 wherein the gyro data includes rates of rotation of the smartphone.

13. A method for calibrating a relative orientation of a smartphone in a vehicle, the smartphone including a GPS receiver generating GPS data, the smartphone including a magnetometer generating magnetometer data, the method including the steps of:

a) collecting the GPS data and the magnetometer data;

b) estimating the relative orientation of the smartphone based upon a comparison of the GPS data and the magnetometer data, wherein said step b includes the steps of:

estimating a yaw angle of the smartphone relative to the vehicle a plurality of times during a minitrip to generate a plurality of yaw angle estimates;

treating each of the plurality of yaw angle estimates as a particle in a particle cloud representation of a probabilistic determination; and obtaining a final estimate of the yaw angled based upon the particle cloud representation.

14. The method of claim 13 wherein said step b) further includes the step of filtering out invalid GPS data and invalid magnetometer data.

15. The method of claim 13 wherein said step b) further includes the step of assigning a weight to each particle based upon correlation of GPS data and magnetometer data within a window of time.

* * * * *